J. McClure,
Hollow Auger.

No. 58,658. Patented Oct. 9, 1866.

Witnesses:
W. B. Crosby
L. H. Latimer

Inventor:
Jacob McClure

UNITED STATES PATENT OFFICE.

JACOB McCLURE, OF ROCKLAND, MAINE.

IMPROVEMENT IN HOLLOW AUGERS.

Specification forming part of Letters Patent No. 58,658, dated October 9, 1866.

*To all whom it may concern:*

Be it known that I, JACOB McCLURE, of Rockland, in the county of Knox, in the State of Maine, have invented a new and Improved Adjustable Tool or Apparatus for Cutting Round Tenons of Various Diameters; and I do hereby declare that the following, taken in connection with the drawings which accompany and form part of this specification, is a description of my invention sufficient to enable those skilled in the art to practice it.

To produce a tool or apparatus the opposite in its operation of an adjustable expansible bit or auger, to be used for the purpose of forming cylindrical tenons—like those made on the ends of spokes, for example—is the object of my invention.

Figure 1:
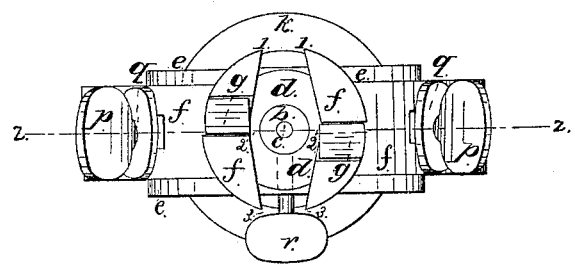
Figure 2:
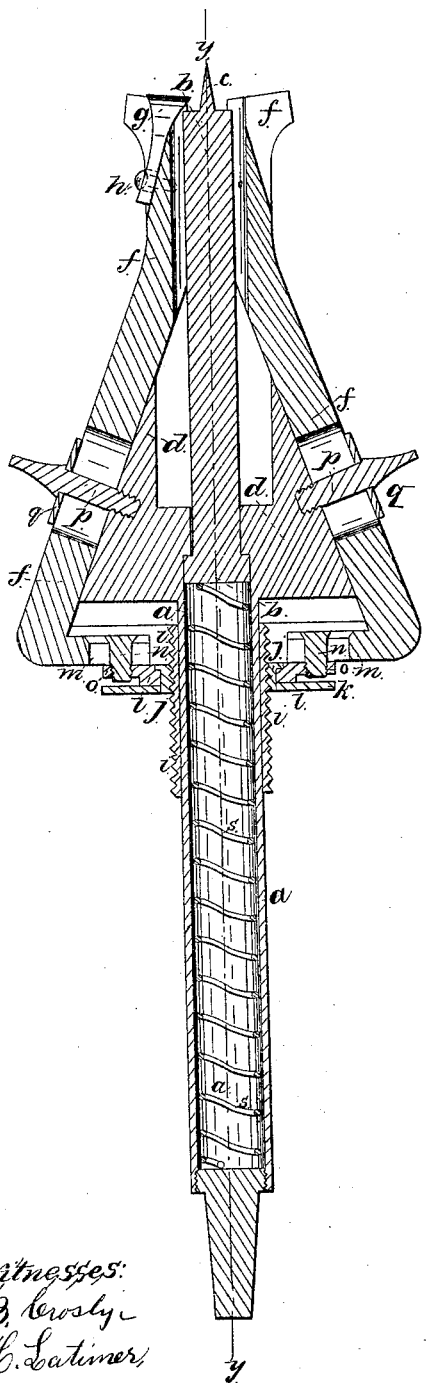
Figure 3:
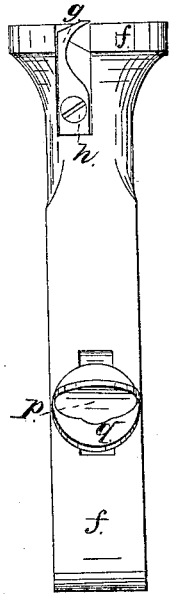

Figure 1 of the drawings shows in plan an apparatus embodying my invention. Fig. 2 is a longitudinal section of the same, taken in the line $z\,z$, and Fig. 3 is a side elevation of one of the pieces $f$.

This apparatus, which may be operated like a drill, auger, or other similar tool, by the rotating spindle of a lathe or other machine, or by hand with an ordinary bit-stock, is constructed as follows:

The shank of the instrument is marked $a$, and is bored out to receive and guide a movable center-shaft, $b$, which is provided with a centering-point, $c$, of any desirable shape. To the shank $a$ is secured a piece, $d$, having sides equally inclined with respect to the axis or center line of rotation $y\,y$, said sides being provided with flanges $e\,e$. Located on said sides, and capable of being adjusted in a vertical direction thereupon, and of being firmly secured thereunto, being held and guided between the flanges $e\,e$, are jaws $f\,f$, which at their upper ends are provided with cutters $g$. The inner faces of each of these jaws are plane surfaces, and against said plane faces the cylindrical surface of the tenon bears as it is formed by the cutters $g\,g$, these being capable of adjustment by means of screws $h$, so as to cut a thicker or thinner chip or shaving, and, by thin strips placed between the cutters and their beds, they may be adjusted relatively to the plane surfaces.

Upon the shank $a$ screw-thread is formed, (seen at $i\,i$,) on which the nut $j$ can be turned by its wheel $k$, carrying with it the ring $l$, fitting in a groove made around the nut $j$.

The ends $m$ of the pieces $f$ are slotted, so as to embrace the headed pins $n$, fixed in ears $o$, forming parts of the ring $l$, these pins keeping the ring $l$ from turning with the nut and forming, with the ring $l$ and ears $o$, the connections by which the pieces $f$ are moved by the nut upon the piece $d$, to increase or contract the distance apart of the cutters $g$, and thereby to vary the diameter of the tenon to be formed.

In moving the pieces $f$ it is obvious that the slotted pieces $m$ will move in and out upon the pins $n$. To keep the pieces $f$ on their bearings on piece $d$, screws $p$, provided with washers $q$, are used, the pieces being slotted sufficiently to allow the movement of $f\,f$ required. When, by movement of $f\,f$, the cutters are adjusted so as to form a tenon of the desired size, the screws $p$ form the means by which the parts are clamped in position, said screws being slackened when the pieces $f$ are to be moved by the nut $j$, for the purpose described.

It is evident that movement of the nut $j$ away from that part of shank $a$ by which it is held will reduce the distance apart of the cutters, and that movement in the reverse direction will have the opposite effect.

In commencing to operate with the described apparatus the shaft $b$ is held by the screw $r$, so that the centering-point $c$ shall project beyond the edges of the cutters $g$; and as these commence to cut away the wood, the screw $r$ is to be slackened to permit retreat of the shaft $b$ into the hollow shank $a$, compressing the spring $s$, which, if used, is made very slight, its only function being to return the shaft $b$ and its center point after each operation, instead of leaving this to be done by the workman.

The action of the apparatus is doubly guided, first, by the center point; and, next, by both the center point and the plane surfaces forming the angles 2.

From the facility with which this instrument can be adjusted to cut a cylindrical tenon of any given diameter and length within its structural range, which is quite large, its practical utility will be obvious. In a few moments it can be adjusted so as to fit holes made by augers and bits which bore odd sizes, from the fact of being worn by use and sharpening, and one instrument may be made to take the place of several which perform the work of making cylindrical tenons, but of invariable sizes.

I claim—

Adjusting the cutters to different sizes of tenons by means of inclined cutter-bearing pieces sliding upon inclined supporting-pieces, and made adjustable thereon, and used in combination with a receding center, arranged to operate substantially as described.

JACOB McCLURE.

Witnesses:
J. B. CROSBY,
L. H. LATINER.